March 23, 1965 D. C. CAPPS 3,174,265
PNEUMATIC COTTON HARVESTER WITH CYCLONIC ACTION
Filed April 13, 1962 2 Sheets-Sheet 1

INVENTOR.
DAVID C. CAPPS
BY Lilly & Nyhagen
ATTORNEYS

March 23, 1965   D. C. CAPPS   3,174,265
PNEUMATIC COTTON HARVESTER WITH CYCLONIC ACTION
Filed April 13, 1962   2 Sheets-Sheet 2

INVENTOR.
DAVID C. CAPPS
BY
Lilly & Nyhagen
ATTORNEYS

United States Patent Office 3,174,265
Patented Mar. 23, 1965

3,174,265
PNEUMATIC COTTON HARVESTER WITH
CYCLONIC ACTION
David C. Capps, 104 Bloomquist Drive, Bakersfield, Calif.
Filed Apr. 13, 1962, Ser. No. 187,342
4 Claims. (Cl. 56—12)

This invention relates generally to cotton harvesting machines and, particularly, to a pneumatic cotton harvester.

Numerous and varied cotton harvesting machines have been devised. These existing cotton harvesting machines have not proven to be completely satisfactory, however, for one reason or another. Most existing cotton harvesters, for example, utilize mechanical devices of various kinds for removing the tufts of cotton from the cotton plants. These devices are generally quite complex and costly to manufacture and, in most cases, require frequent costly and time consuming repairs or reconditioning.

Another deficiency of many of the existing harvesting machines is their relatively slow speed of operation and their resultant small capacity. A problem which is inherent in a large number of the machines and is, perhaps, more serious than any of those mentioned above is that dirt, branches and/or other debris is collected along with the cotton. This creates a subsequent complex and costly operation for separating the cotton from the debris.

A general object of this invention is to provide a cotton harvesting machine in which the cotton tufts are separated from the cotton plants and conveyed to a receiver on the harvesting vehicle entirely by a pneumatic process and in such a way that the deficiencies inherent in the existing harvesting machines are minimized or entirely eliminated.

Another object of the invention is to provide a cotton harvester of the character described in which the pneumatic process for separating the cotton tufts from the cotton plants involves a unique cyclonic action which twists the tufts to break them free from the cotton plants and then blows them into a collection chamber from where they are exhausted by suction and delivered to the receiver.

Yet another object of the invention is to provide a cotton harvester of the character described in which the collection of dirt, branches and other debris along with the cotton is effectively minimized.

A further object of the invention is to provide a cotton harvester of the character described in which the harvesting device proper has no moving parts whatsoever and in which the harvester as a whole has a minimum of moving parts, whereby the harvester is relatively simple in construction, inexpensive to manufacture, and does not require frequent servicing.

Yet a further object of the invention is to provide a cotton harvester of the character described which is capable of a relatively high speed of operation, is easy to operate, and otherwise ideally suited to its intended purposes.

Other objects, advantages, and features of the invention will become readily apparent as the description proceeds.

A presently preferred embodiment of the invention will now be described by reference to the attached drawings, wherein.

Figure 1:
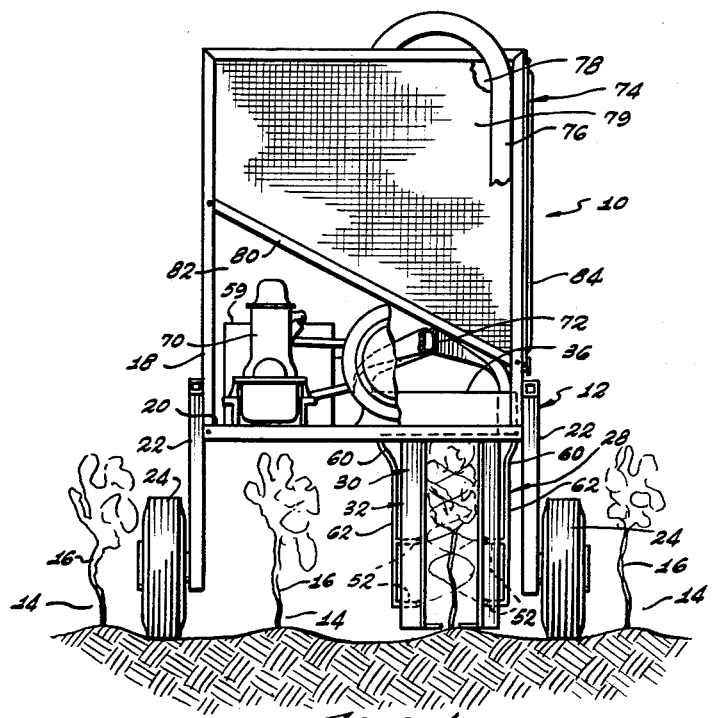
FIG. 1 is a rear elevation of a harvesting machine according to the invention.
Figure 2:
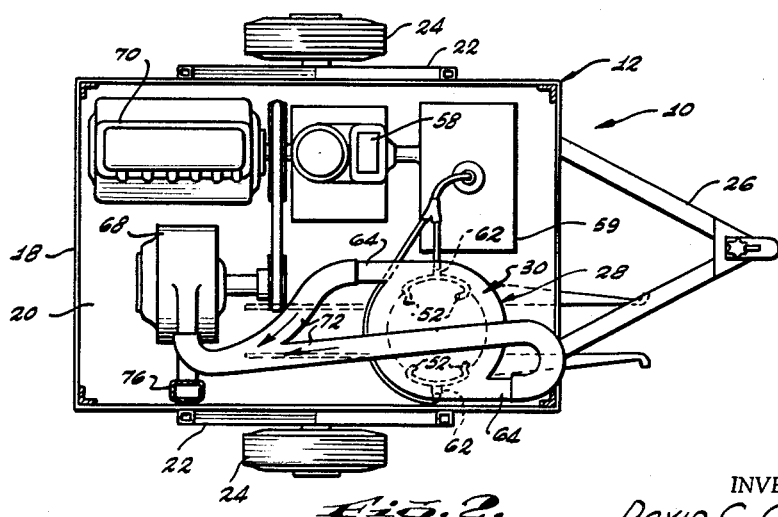
FIG. 2 is a top plan view of the harvesting machine in FIG. 1 with the cotton receiver removed to expose the parts therebelow.

The cotton harvester 10 illustrated in these drawings comprises a vehicle 12 adapted to move along adjacent row 14 of cotton plants 16. For simplicity, vehicle 12 has been illustrated as being a simple trailer-type vehicle adapted to be towed by another vehicle. It will become evident as the description proceeds, however, that the features of this invention can be embodied, as well, in a cotton harvester equipped with a self-propelled vehicle.

Vehicle 12 comprises a frame 18 having a bottom supporting bed 20. Attached to the sides of the frame 18 and depending a distance below the bed 20 are two wheel supports 22. Rotatably mounted on the lower ends of these supports are wheels 24. Wheels 24 are spaced to straddle a number of adjacent rows 14 of cotton plants, as shown. The supporting bed 20 of the vehicle 12 is located in the elevated position shown to accommodate movement of the vehicle over the tops of the underlying cotton plants. Attached to the forward end of the vehicle is a hitch 26 for connection to a suitable towing vehicle, not shown.

Figure 3:
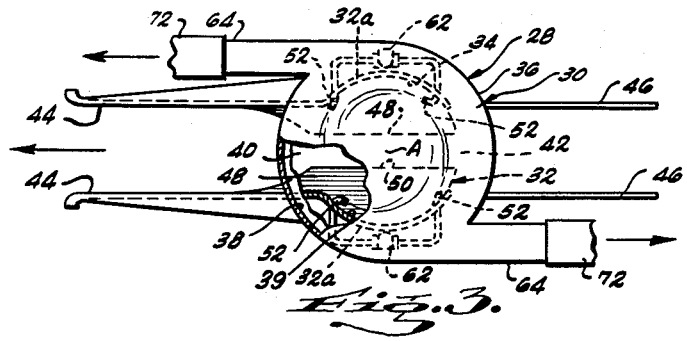
FIG. 3 is a top plan detail of a cyclonic cotton harvesting chamber taken from FIGS. 1 and 2 with parts broken away for clarity.
Figure 4:
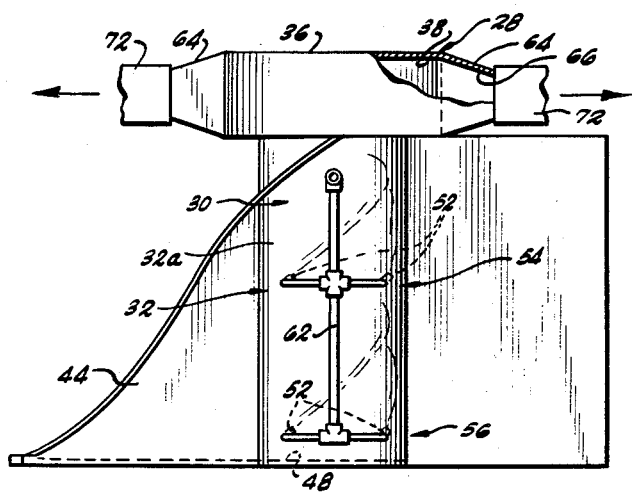
FIG. 4 is a side elevation of the cyclonic chamber in FIG. 3 with parts broken away for clarity.
Figure 5:
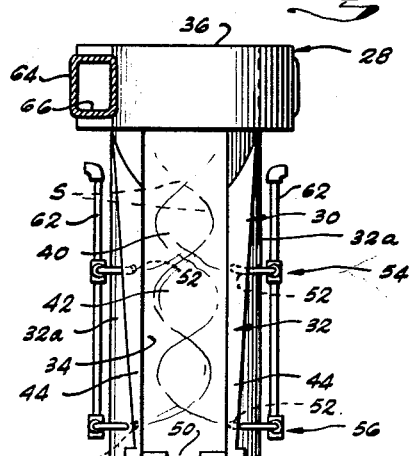
FIG. 5 is a front elevation of the cyclonic chamber in FIG. 3.

The pneumatic cotton harvesting device proper, with which this invention is primarily concerned, is designated in its entirety by the numeral 28. This device includes a housing 30 which is mounted on and a portion of which depends below the underside of the supporting bed 20 of the vehicle 12 at a position offset from the longitudinal center line of the vehicle for movement of the housing 30 with the vehicle 12 along one of the rows 14 of cotton plants 16 straddled by the vehicle. The cotton harvesting device 28 will now be described in greater detail by reference to FIGS. 3–5.

As shown in these latter figures, the housing 30 of the cotton harvesting device 28 comprises a lower, generally cylindrical housing portion 32 composed of two generally semi-cylindrical wall sections 32a. In the installed position of the device on the vehicle 12, the lower end of this lower housing portion is located at the level of the stalks of the cotton plants 16, as may be best observed in FIG. 1. Within the cylindrical housing portion 32 is a generally circular harvesting chamber 34.

Housing 30 of the harvesting device 28 further includes an upper, generally cylindrical housing portion 36 rigidly attached to the upper end of the lower housing portion 32. The upper housing portion 36 is somewhat larger in diameter than the lower housing portion 32. Within the upper housing portion 36 is a generally circular collection chamber 38 which opens to the upper end of the harvesting chamber 34 through an exhaust opening 39 in the upper end of the harvesting chamber.

In the forward side of the lower housing portion 32 is an entrance opening 40 which extends longitudinally of the lower housing portion and through which the cotton plants 16 in the row 14 along which the harvesting device 28 moves are adapted to enter the harvesting chamber 34. In the rear side of the lower housing portion 32 is an exit opening 42 which extends longitudinally of the lower housing portion and through which the cotton plants are adapted to emerge from the harvesting chamber. Indicated at 44 are a pair of parallel guide plates which are secured along their rear edge to the lower housing portion 32, at opposite sides of the entrance opening 40, for leading the cotton plants into the entrance opening. The lower edges of the forward guide plates 44 are substantially coplanar with the lower end of the lower housing portion 32. The upper edges of the forward guide plates 44 slope upwardly as the edges approach the lower housing portion 32. These sloping upper edges of the guide plates guide the branches of the cotton plants into the space between the guide plates 44, whereupon the latter guide the plants to the entrance opening 40 of the harvesting chamber 34. As each cotton plant enters the harvesting chamber 34, of course, its branches tend to spring outwardly. The curving walls of the harvesting chamber, however, compress the branches of each plant as the latter approaches the exit opening 42 so that each plant passes smoothly from the harvesting chamber through the exit opening.

Secured to the lower housing portion 32, at opposite sides of the exit opening 42, are a pair of vertical rear guide plates 46. These rear guide plates serve to guide the cotton plants as they emerge from the harvesting chamber.

Within and secured to the lower ends of the semicylindrical sections 32a of the lower housing portion 32 are two generally semicircular dirt shields 48. Dirt shields 48 define therebetween a slot or passageway 50 which is aligned with but somewhat narrower than the entrance and exit openings 40 and 42. This passageway is proportioned to receive the stalks of the cotton plants passing through the harvesting chamber 34. The purpose for the dirt shields 48 will be explained shortly.

Within the harvesting chamber 34 is a plurality of nozzles 52. Nozzles 52 have been illustrated as comprising two sets 54 of upper nozzles and two sets 56 of lower nozzles which are mounted on the sections 32a, respectively, of the lower housing portion 32. The lower nozzle sets 56 are located proximate to the lower end of the lower housing portion 32 and the upper nozzle sets 54 are located approximately midway between the upper and lower ends of the lower housing portion. Nozzles 52 are supplied with air under pressure from a compressor 58 mounted on the supporting bed 20 of the vehicle 12 through a receiving air tank 59, hoses 60, and header pipes 62 mounted on the outsides of the lower housing sections 32a.

Nozzles 52 are tangentially directed and upwardly inclined, as illustrated. That is to say, each nozzle 52 is inclined upwardly at an acute angle toward the exhaust opening 39 with respect to a plane normal to the central axis A of the harvesting chamber 34, i.e., a horizontal plane, passing through the respective nozzle. Also each nozzle opens transversely of a plane containing the axis A and passing through the respective nozzle. Thus each nozzle opens generally tangentially or circumferentially of the chamber 34. All of the nozzles 52 open in the same direction around the axis A. As a result, air under pressure is discharged into the harvesting chamber 34 in a multiplicity of upwardly spiraling air streams S. These air streams produce an upward cyclonic air flow or vortex in the harvesting chamber which twists the cotton tufts loose from the cotton plants passing through the harvesting chamber. The loosened tufts are carried upwardly by the cyclonic air flow into the collection chamber 38 in the upper housing portion 36.

The upper portion 36 of the housing 30 has two tangential outlet extensions 64. Within these extensions are passages 66 which open to and extend tangentially from the upper collection chamber 38. It will be observed that the direction of extension of the passages 66 conforms to the direction of rotation of the cyclonic air flow produced in the harvesting chamber 34 by the nozzles 52. Accordingly, there is a tendency for the whirling cotton tufts which are carried upwardly to the collection chamber by the cyclonic air flow to be discharged through the passages 66 by centrifugal force.

The cotton tufts are exhausted from the collection chamber through the passages 66 as follows: Mounted on the supporting bed 20 of the vehicle 12 is a low pressure blower 68. This blower is driven from a motor 70, mounted on the bed 20, which also drives the compressor 58. The intake of the blower 68 is connected to the tangential outlet passages 66 from the collection chamber 38 by conduits 72. The discharge of the blower 68 is connected to a cotton receiver 74 on the vehicle 12 by a conduit 76 which opens into the upper end of the cotton-receiving chamber 78 in the receiver. The blower 68, therefore, creates a vacuum which exhausts the loosened cotton tufts from the collection chamber 38 through its tangential outlet passages 66, and the conduit 76 discharges the tufts into the receiving chamber 78 of the receiver 74. The cotton tufts, therefore, actually pass through the blower 68.

The receiver 74 comprises a rectangular bin-like structure attached to the vehicle frame 18 and having wire mesh sides 79. The receiver has a bottom wall 80 which slopes downwardly toward the right-hand side of the vehicle 12, as the latter is viewed in FIG. 1. This slope of the bottom receiver wall 80 has a twofold advantage. First, it affords a space 82 above the vehicle bed 20 for containing the compressor 58, air tank 59, blower 68, and the driving motor 70 for these components. Secondly, it provides for movement of the cotton tufts from the receiving chamber 78 by gravity through doors 84 in the right-hand side of the receiver 74, when these doors are opened.

Operation of the illustrated cotton harvester is obvious from the foregoing description. Thus, as the harvesting vehicle 12 is towed along the rows 14 of cotton plants 16, the wheels 24 of the vehicle straddle adjacent rows of the plants. During movement of the vehicle along the rows, the plants in one of the rows pass through the harvesting chamber 34 of the pneumatic harvesting device 28, the plants entering the harvesting chamber through the space between the forward guides 44 and through the entrance opening 40 to the harvesting chamber and emerging from the chamber through the exit opening 42 and the space between the rear guides 46. As each cotton plant passes through the harvesting chamber, its cotton tufts are twisted loose by the cyclonic air flow in the harvesting chamber. The loosened tufts are carried upwardly by the cyclonic air flow to the collection chamber 38 from whence they are exhausted through the outlet passages 66 and delivered to the receiving chamber 78 by the blower 68.

The cotton harvester has several features of construction which greatly minimize the amount of dirt, branches and other debris which is collected along with the cotton. Thus, the dirt shields 48 in the lower end of the harvesting chamber 34, which are spaced just sufficiently to accommodate movement of the stalks of the cotton plants through the harvesting chamber, prevent dirt, branches and other debris on the ground from being picked up by the cyclonic air flow in the harvesting chamber. Picking up of dirt from the ground is also minimized by the fact that the lower nozzles 56 are located a distance above the lower end of the collection chamber and the fact that these nozzles are not directed straight up which would result in a strong tendency for dirt and other debris on the ground below the harvesting chamber to be sucked up into the chamber. Moreover, the cyclonic action of the harvester, which results in loosening of the cotton tufts from the cotton plants by twisting rather than by the action of air streams directed directly against the plants, permits the use of a relatively low air pressure. For example, the optimum air pressure has been found to be on the order of thirty to sixty pounds per square inch. This low air pressure further minimizes the tendency for debris to be sucked up into the harvesting chamber from the ground below the chamber. The tangential directions of the nozzles 52, which create the cyclonic air flow for twisting the cotton tufts loose from the cotton plants, produce appreciably less agitation of the plants than would occur if the air streams were directed directly against the plants to blow the cotton tufts loose. As a result, there is less tendency for the branches and leaves of the cotton plants to be broken loose and collected along with the cotton. As a result, cotton harvested with the present harvesting machine is very much cleaner and of a higher quality than that harvested by any of the existing harvesting machines.

It is evident that the present harvesting machine is capable of a high speed of operation and, therefore, possesses a large capacity. Because of the fact that the pneumatic harvesting device 28 proper has no moving parts whatsoever and the fact that the only moving parts in the overall harvesting machine are those contained in the motor, compressor, and blower of the machine, the present cotton harvester is simple and inexpensive to manufacture, requires very infrequent servicing, and possesses all of the other advantages preliminarily mentioned.

Clearly, then, the invention herein described and illustrated is fully capable of attaining the several objects and advantages preliminarily set forth.

While a presently preferred embodiment of the invention has been disclosed for illustrative purposes, numerous modifications in the design, arrangement of parts, and instrumentalities of the invention are clearly possible within the spirit and scope of the following claims.

What is claimed is:

1. A cotton harvester comprising:
   a vehicle adapted for movement along rows of cotton plants,
   a vertical, generally cylindrical housing mounted on said vehicle for movement with the latter along said rows,
   said housing having an open lower end disposed approximately at the level of the stalks of the cotton plants and a vertical cyclonic harvesting chamber which opens through said lower end of the housing,
   there being a vertical entrance opening to said chamber in the forward side of said housing through which the cotton plants in each plant row traversed by the housing enter the chamber and a vertical exit opening from said chamber in the rear side of said housing through which the entering cotton plants emerge from the chamber,
   a plurality of nozzles arranged about the wall of said chamber,
   each nozzle being inclined upwardly at an acute angle from a horizontal plane passing through the respective nozzle and each nozzle opening in a transverse direction of a plane passing through the respective nozzle and containing the central axis of the chamber, all of the nozzles opening in the same direction around the periphery of the chamber,
   means on said vehicle for supplying air under pressure to said nozzles, whereby the air issuing from the nozzles creates an upward cyclonic air flow in said chamber which tends to twist the cotton tufts loose from each cotton plant passing through the chamber and to blow the loosened tufts upwardly toward the upper end of said chamber,
   a receiving chamber on said vehicle, and
   a blower for exhausting the loosened tufts from the upper end of said harvesting chamber to said receiving chamber.

2. A cotton harvester comprising:
   a vehicle adapted for movement along rows of cotton plants,
   a vertical, generally cylindrical housing mounted on said vehicle for movement with the latter along said rows,
   said housing having an open lower end disposed approximately at the level of the stalks of said plants and a vertical cyclonic harvesting chamber which opens through said lower end of the housing,
   there being a vertical entrance opening to said chamber in the forward side of said housing through which the cotton plants in each plant row traversed by the housing enter the chamber and a vertical exit opening from said chamber in the rear side of said housing through which the entering cotton plants emerge from the chamber,
   a plurality of nozzles arranged about the wall of said chamber,
   each nozzle being inclined upwardly at an acute angle from a horizontal plane passing through the respective nozzle and each nozzle opening in a transverse direction of a plane passing through the respective nozzle and containing the central axis of the chamber, all of the nozzles opening in the same direction around the periphery of the chamber,
   means on said vehicle for supplying air under pressure to said nozzles, whereby the air issuing from the nozzles creates an upward cyclonic air flow in said chamber which tends to twist the cotton tufts loose from each cotton plant passing through the chamber and to blow the loosened tufts upwardly toward the upper end of said chamber,
   a receiving chamber on said vehicle,
   there being at least one passage opening tangentially to the upper end of said harvesting chamber and extending from the latter in the direction of rotation of said cyclonic air flow, and
   a blower for exhausting the loosened tufts from the upper end of said harvesting chamber through said passage and delivering the exhausted tufts to said receiving chamber.

3. A cotton harvester comprising:
   a vehicle adapted for movement along rows of cotton plants,
   a housing mounted on said vehicle for movement with the latter along said rows,
   said housing including a lower, generally cylindrical portion having an open lower end disposed approximately at the level of the stalks of said plants and a vertical cyclonic harvesting chamber which opens through the lower end of said housing portion,
   said housing further including an upper cylindrical portion of greater diameter than said lower portion and having a collection chamber opening to the upper end of said harvesting chamber,
   there being a vertical entrance opening to said harvesting chamber in the forward side of said lower housing portion through which the cotton plants in each plant row traversed by the housing enter the harvesting chamber and a vertical exit opening from said harvesting chamber in the rear side of said lower housing portion through which the entering cotton plants emerge from the latter chamber,
   a plurality of nozzles arranged about the wall of said harvesting chamber,
   each nozzle being inclined upwardly at an acute angle from a horizontal plane passing through the respective nozzle and each nozzle opening in a transverse direction of a plane passing through the respective nozzle and containing the central axis of the chamber, all of the nozzles opening in the same direction around the periphery of the chamber,
   means on said vehicle for supplying air under pressure to said nozzles, whereby the air issuing from the nozzles creates an upward cyclonic air flow in said harvesting chamber which tends to twist the cotton tufts loose from each cotton plant passing through the latter chamber and to blow the loosened tufts upwardly into said collection chamber,
   a receiving chamber on said vehicle,
   there being at least one passage opening tangentially to said collection chamber and extending from the latter in the direction of rotation of said cyclonic air flow, and
   a blower for exhausting the loosened tufts from said collection chamber through said passage and delivering the loosened tufts to said receiving chamber.

4. A cotton harvester comprising:
a vehicle adapted for movement along rows of cotton plants,
a housing mounted on said vehicle for movement with the latter along said rows,
said housing having an open lower end disposed approximately at the level of the stalks of the cotton plants and a cyclonic harvesting chamber which opens through said lower end of the housing,
there being a vertical entrance opening to said chamber in the forward side of said housing through which the cotton plants in each plant row traversed by the housing are adapted to enter the chamber and a vertical exit opening from said chamber in the rear side of said housing through which the entering plants are adapted to emerge from the chamber, whereby relative movement of the entering plants through the chamber occurs along a path extending from said entrance opening to said exit opening,
a plurality of nozzles within said chamber at the approximate level at which the upper cotton bearing portions of said plants pass through the chamber and arranged about a vertical axis extending through said chamber in intersecting relation to said path,
means for supplying air under pressure to said nozzles,
a receiver communicating to said harvesting chamber through an exhaust opening on said axis,
each nozzle being inclined at an acute angle toward said exhaust opening with respect to a plane normal to said axis and passing through the respective nozzle and each nozzle opening in a transverse direction of a plane containing said axis and passing through the respective nozzle,
said nozzles opening in the same direction around the periphery of the chamber, whereby said nozzles create a cyclonic air flow in said chamber toward said exhaust opening which tends to twist the cotton tufts loose from each cotton plant passing through said harvesting chamber and blow the loosened tufts toward said exhaust opening, and
a blower for exhausting the loosened tufts from said harvesting chamber through said exhaust opening to said receiver.

References Cited in the file of this patent
UNITED STATES PATENTS

| | | |
|---|---|---|
| 418,385 | Saltenberer | Dec. 31, 1889 |
| 451,589 | Baldwin | May 5, 1891 |
| 2,111,030 | Mote | Mar. 15, 1938 |
| 2,763,978 | Graham et al. | Sept. 26, 1956 |

FOREIGN PATENTS

| | | |
|---|---|---|
| 117,127 | Russia | Apr. 11, 1959 |